E. CROMPTON AND C. L. CROOKS.

LATCH.

APPLICATION FILED AUG. 20, 1920.

Reissued Oct. 5, 1920. 14,953.

INVENTORS

Edwin Crompton & C. L. Crooks.

by R. H. Leonard their ATTORNEY.

UNITED STATES PATENT OFFICE.

EDWIN CROMPTON AND CHARLES L. CROOKS, OF PUEBLO, COLORADO.

LATCH.

14,953. Specification of Reissued Letters Patent. Reissued Oct. 5, 1920.

Original No. 1,281,144, dated October 8, 1918. Serial No. 228,530, filed April 15, 1918. Application for reissue filed August 20, 1920. Serial No. 404,917.

*To all whom it may concern:*

Be it known that we, EDWIN CROMPTON and CHARLES L. CROOKS, citizens of the United States, and residents of Pueblo, in the county of Pueblo and State of Colorado, have invented certain new and useful Improvements in Latches, of which the following is a full, clear, and exact description.

Our invention is an improvement in latches and, while of general applicability, it is especially adapted for use on automobile doors. The principal object of our invention is the provision of a combined latching and locking device, in which both the latching and locking operations are automatically performed by the act of closing the door and in which a single movement will both unlatch and unlock without the use of keys or the like.

Further and more particular objects and advantages of our invention will later appear from this specification.

Figure 1:
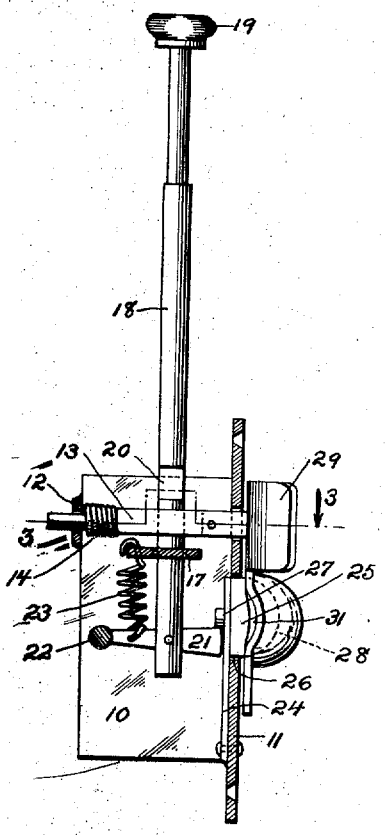
Figure 2:
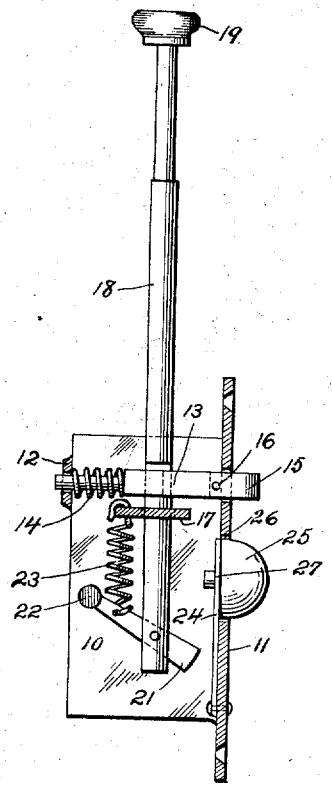
Figure 3:
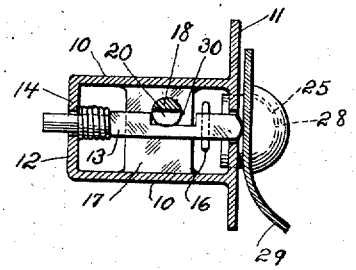

In the single sheet of drawings accompanying this application and forming a part hereof Figure 1 is a partial vertical section and partial side elevation of a latch and keeper embodying our invention, the parts being shown in locked position;

Fig. 2 is a vertical section through the latch portion of the device illustrated in Fig. 1, the parts being shown in unlocked position; and Fig. 3 is a horizontal section taken on the broken line 3—3 of Fig. 1.

Referring to the drawings, in which like characters designate like parts in the several views, it will be seen that our latch comprises a casing having parallel side members 10 and a face plate 11. This casing is preferably open at the top and bottom and at the rear save for a transverse brace 12 which also forms a guide for a horizontal plunger 13. This plunger preferably has a reduced rear portion as shown which is encircled by a spring 14 which tends to maintain the plunger at the right of its travel and with its outer slightly curved end 15 projecting well beyond the face plate 11. A stop 16 serves to limit the extent of the protrusion of the horizontal plunger. There is a transverse horizontal brace 17 extending between the side plates 10 and this brace has a circular opening therein. Within this opening there is guided a vertical plunger 18 provided on its upper end with an operating knob 19 and in its shank adjacent the horizontal plunger with a square shouldered notch 20. To the lower end of the plunger 18 there is pivotally connected a finger 21 which finger is mounted on a spindle 22 journaled in the side members 10. A spring 23 connected to the finger 21 and to the cross brace 17 tends always to raise the plunger and its connected finger 21 to the position shown in Fig. 1.

The latching mechanism comprises a leaf spring 24 secured at its lower end to the inner side of the face plate 11 and carrying at its upper end a substantially semi-spherical knob 25. The knob 25 is so located as to travel in a circular recess 26 in the face plate 11, being substantially withdrawn therethrough when the leaf spring 24 is forced back. A stop 27 is located at the rear of the knob 25 in such position as to engage the finger 21 and limit the upward throw of the same.

The preferred form of keeper for use with our latch is shown in side view in Fig. 1 and in cross section in Fig. 3. This keeper comprises a semi-spherical recess 28 adapted to receive the similar shaped knob 25 and an inclined surface 29 above the recess 28 is in position to engage the face 25 of the horizontal plunger 13.

The horizontal plunger 13 is provided with a square shouldered recess 30 in one side thereof for a purpose later to be described.

*Operation.*

As previously stated the parts are shown in Fig. 1 in locked position, the knob 25 being home in the recess 28 and being retained therein by the finger 21 which is in a position substantially at right angles to the leaf spring 24 and bears thereagainst. The device will preferably be mounted with the knob 19 in convenient position to be operated from the upper edge of the door.

Pressure on the knob 19 will depress the plunger 18, thus swinging the finger 21 to the position shown in Fig. 2 and out of contact with the leaf spring 24. If now the parts be held in this position a gentle pressure against the door will cause the knob 25 to be forced out of its socket against the action of the spring 24 on account of the shape given the knob and its socket and the door may now be opened. As the face 15 of the horizontal plunger 13 passes out over the surface 29 the spring 14 will shoot the horizontal plunger 13 to the position shown in Fig. 2 and the unreduced portion 13 will enter the notch 20 in the vertical plunger 18; thus the plunger 13 acts as a catch to retain the parts in the position shown in Fig. 2 as long as the door is open. If the door be forced shut the knob 25 will still be free to pass around the surface 31 on the keeper plate and snap back into its socket 28 but the horizontal plunger 13 will be forced to the rear by the surface 15 traveling over the surface 29 of the keeper and as the device reaches the position shown in Figs. 1 and 3 this movement of 13 will be such as to bring the notch 30 fully opposite the vertical plunger 18 and this plunger will be raised by the spring 23 to bring the finger 21 to position against the stop 27. When in this position the parts are securely locked.

While we have described our device in considerable detail it will be obvious that many changes in these details and arrangement of parts may be made without departing from our invention and we do not, therefore, desire to be considered as limited to the precise form shown and described.

Having thus described our invention what we claim and desire to secure by Letters Patent is:

1. In a device of the class described, a latch and keeper, said latch comprising a member resiliently projected therefrom, an oscillating finger in position to engage said member in normal position of the device to lock the member in projected position, a plunger connected to said finger to move the finger from the path of said member, a spring tending to resist such action, and spring pressed means adapted to engage said plunger to retain said finger in inoperative position.

2. In a device of the class described, a latch and keeper, said latch comprising a member resiliently projected therefrom, an oscillating finger in position to engage said member in normal position of the device to lock the member in projected position, a plunger connected to said finger to move the finger from the path of said member, a spring tending to resist such action, and a catch adapted to engage said plunger to retain said finger in inoperative position while the latch is away from the keeper.

3. In a device of the class described, a latch and keeper, said latch comprising a member resiliently projected therefrom, an oscillating finger in position to engage said member in normal position of the device to lock the member in projected position, a plunger connected to said finger to move the finger from the path of said member, a spring tending to resist such action, and a spring pressed catch adapted to engage said plunger to retain said finger in inoperative position, said keeper having a surface adapted to engage said catch to free said plunger.

4. In a device of the class described, a latch and keeper, said latch comprising a spring pressed knob projecting therefrom, an oscillating finger in position to engage the rear of said knob in normal position of the device, a plunger connected to said finger to depress the same, a spring tending to resist such action, and a catch adapted to engage said plunger to retain said finger in inoperative position while the latch is away from the keeper.

5. In a device of the class described, a latch and keeper, said latch comprising a spring pressed knob projecting therefrom, an oscillating finger in position to engage the rear of said knob in normal position of the device, a plunger connected to said finger to depress the same, a spring tending to resist such action, and a spring pressed catch adapted to engage said plunger to retain the same in depressed position, said keeper comprising a recess adapted to receive said knob and an inclined surface adapted to repress said catch to free said plunger.

6. In a device of the class described, a latch and keeper, said latch comprising a face plate having an opening therein, a knob, a leaf spring secured to said face plate at one end and mounting said knob at its free end in position to project through the opening in the face plate, a rotatable spindle having a finger projecting therefrom in position to engage the rear of said spring, a stop on said spring in the path of said finger, a plunger connected to said finger to depress the same, a spring tending to resist such action, said plunger having a notch therein, a spring pressed catch adapted to reciprocate in the patch of said notch and by engaging the same to hold said plunger in depressed position, said catch also having a notch therein which permits said plunger to travel when said catch is repressed, said keeper comprising a recess adapted to receive said knob and an inclined face adapted to repress said catch.

7. In a lock or latch, the combination of a locking bolt, a device for retaining said bolt in its locking position, such device being movable to release or unlock said bolt, and means controllable by a keeper on the door frame for retaining said device in a position in which said bolt is released or unlocked.

8. In a latch or lock, the combination with a casing, of a locking bolt projecting from the front of the casing, a device for retaining said bolt in its locking position, such device projecting from the upper part of the casing and being manually movable to a position to release or unlock said locking bolt, a second bolt also projecting from the front of said casing for retaining said device in a position in which said locking bolt is released or unlocked, and spring means for actuating said bolts and device.

9. A combined latch and lock comprising a casing, a manually depressible plunger having a part accessible from the exterior of said casing, a device extending across said plunger for retaining the same in its unlocking position, a spring pressed locking element projecting from said casing and means whereby said element is locked when said retaining device is actuated.

In testimony whereof we have hereunto affixed our signatures.

EDWIN CROMPTON.
CHARLES L. CROOKS.